J. GUERRERO.
TIRE FOR VEHICLE WHEELS.
APPLICATION FILED APR. 7, 1916.
1,265,773.
Patented May 14, 1918.
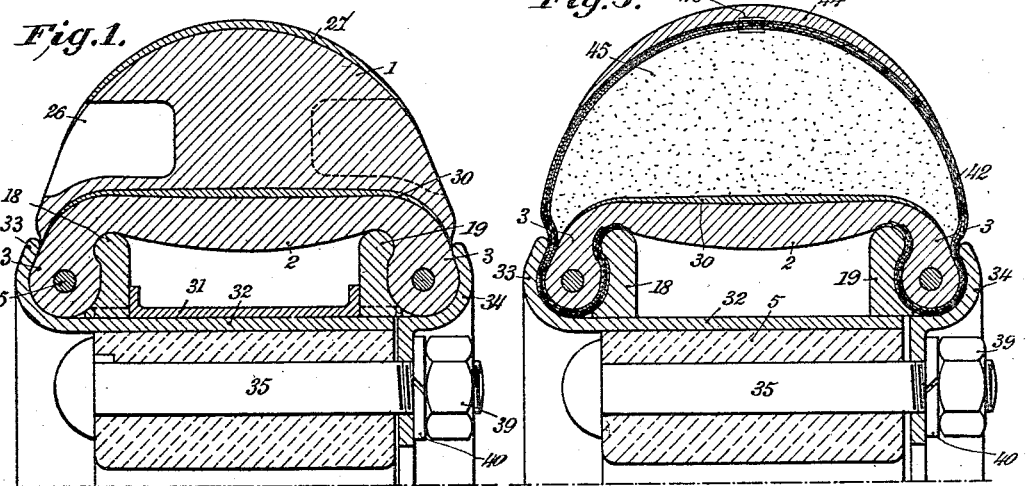
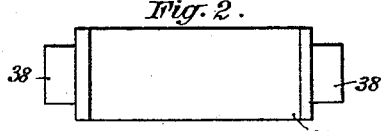
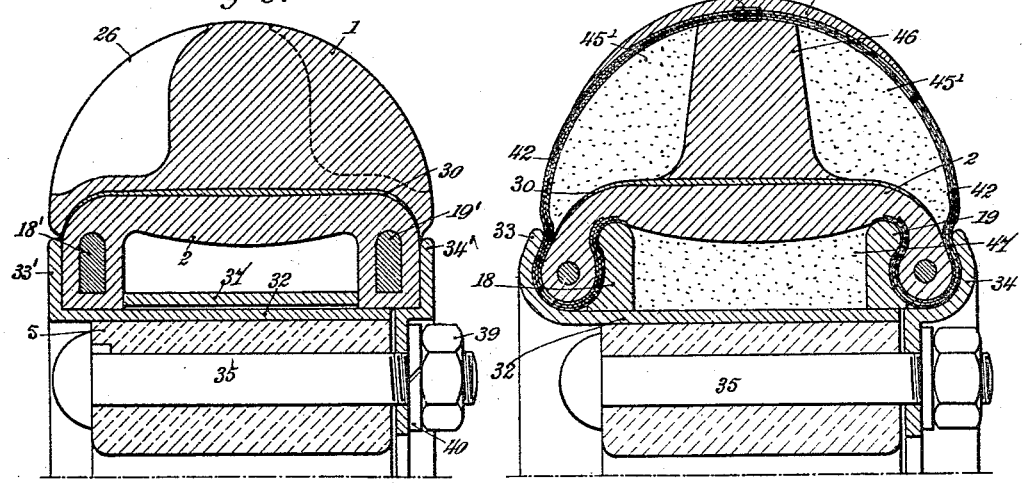
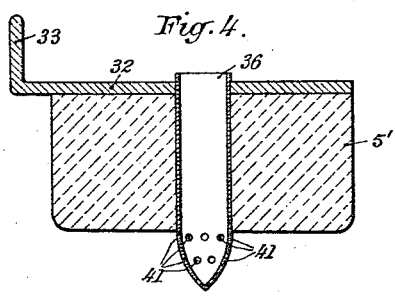
Inventor:
Jorge Guerrero,
By B. Singer,
Atty.

UNITED STATES PATENT OFFICE.

JORGE GUERRERO, OF PARIS, FRANCE.

TIRE FOR VEHICLE-WHEELS.

1,265,773.  Specification of Letters Patent.  Patented May 14, 1918.

Application filed April 7, 1916. Serial No. 89,597.

*To all whom it may concern:*

Be it known that I, JORGE GUERRERO, residing at Paris, France, have invented new and useful Improvements in or Relating to Tires for Vehicle-Wheels, of which the following is a specification.

This invention relates to an elastic tire for vehicle wheels which has the advantage of being resilient, durable and simple in construction.

In the accompanying drawings:

Figure 1 is a cross-section showing a tire according to this invention;

Fig. 2 is a detail view;

Fig. 3 is a cross section showing a second construction;

Fig. 4 shows a ventilation device applicable to the tire, and

Figs. 5 and 6 show two modified constructions.

The tire shown in Fig. 1 comprises an elastic band 2 provided at its edges with beads 3 which are fixed in the rim. This band is exposed to a bending stress between the two beads and carries a tread 1 provided with lateral recesses 26 arranged in a staggered order. To the tread 1 an antiskidding protector 27 may be secured.

Between the tread and the elastic band 2 is inserted an exceedingly supple thin rubber sheet 30 which is secured as for instance by vulcanization to the tread and the band 2. This sheet plays a very important part, as it follows the movements of the band 2 and tends to prevent the formation of hollows between the tread and the band 2.

Against the inner sides of the beads 3 are arranged metal rings 18, 19. During the manufacture of the tire, the rubber is subsequently vulcanized on the rings, so as to insure complete solidarity of the various parts.

The rings 18 and 19 rest on a metal rim 32 secured to the wooden felly and provided on one side with a flange 33 which receives one of the beads of the tire.

In order to maintain the distance apart between the two rings, distance pieces 31 are provided terminating in lugs 38 engaging with recesses in the rings 18 and 19.

At the side opposite to the flange 33 a flange 34 is arranged which is held by bolts 35, nuts 39 and metal washers 40.

When assembling the tire is introduced with the distance pieces 31 on the metal rim, the whole being pushed from right to left in the case of Fig. 1. The flange 34 is then put in place and engages with the right hand bead 3, then the washers 40 are put on and the nuts 39 are screwed on so as to insure sufficient compression.

In the modified construction shown in Fig. 3, the rings 18' and 19', instead of being located against the beads are embedded in the rubber. The flanges 33' and 34' are then given a slightly modified shape, as shown in Fig. 3.

The distance between the two beads, instead of being maintained by distance pieces, can be insured by a ring 37 which surrounds the metal rim 32.

In order to avoid any heating owing to compression of the air contained in the space between the elastic band 2 and the rim, several ventilating ports, such as that shown in Fig. 4, could be provided.

A tube 36 passes through the wooden felly 5' and the metal rim 32 beyond which it projects outward slightly. The tube 36 is provided at the opposite end with small holes 41 which allow the air to escape. The tube 36 can be introduced into openings made in the ring 37 (Fig. 3) or in one of the distance pieces 31 (Fig. 1). In the latter case, it helps to prevent creeping of the tire.

The tread could be made in a different manner from that shown in Figs. 1 and 3.

It can be made, as shown in Fig. 5, from any elastic material 45 such as rubber "mousse", this material being covered with several canvas sheets 42. These sheets completely inclose the beads 3 and are laced together at 43, this joint being covered by a protector 44.

It is also possible to adopt the arrangement shown in Fig. 6 in which the flexible band 2 carries, by means of the sheet 30, a hard rubber ring 46, the elastic material being placed at 45' on each side of the said ring. The joint 43 connecting the sheets 42 being covered by a protector 44.

If desired the annual chamber 47 between the elastic band 2 and the rim, can be filled with elastic material.

Having now particularly described and ascertained the nature of my said invention and in what manner the same is to be performed, I declare that what I claim is:

A tire of the character described, comprising in combination, an elastic band, adapted to carry a tread and provided with beads at its edges, a rubber sheet between said band and tread, metal rings supporting said band resting against the inner sides of said beads, and distance pieces for keeping the rings apart, and terminal lugs on said pieces engaging in recesses of said rings, a metal rim adapted to be secured to the felly of the wheel, a flange on one side of said rim for the reception of one of the beads of said tire, and a flange oppositely arranged to said first named flange and means for securing it to the felly.

In testimony whereof I affix my signature in presence of two witnesses.

JORGE GUERRERO.

Witnessses:
CHAS. P. PRESSLY,
C. A. MAUD.

Copies of this patent may be obtained for five cents each, by addressing the "Commissioner of Patents, Washington, D. C."